United States Patent
Grossman

(10) Patent No.: US 6,694,372 B1
(45) Date of Patent: Feb. 17, 2004

(54) METHOD AND SYSTEM FOR EFFECTIVE NETWORK COMMUNICATION OF AN UNSUPPORTED MEDIA STANDARD BY ENCAPSULATED PACKET TAGGING

(75) Inventor: Leonid Grossman, Cupertino, CA (US)

(73) Assignee: Advanced Micro Devices, Inc., Austin, TX (US)

( * ) Notice: Subject to any disclaimer, the term of this patent is extended or adjusted under 35 U.S.C. 154(b) by 683 days.

(21) Appl. No.: 08/877,465

(22) Filed: Jun. 17, 1997

(51) Int. Cl.⁷ .............................................. G06F 15/16
(52) U.S. Cl. ...................................................... 709/236
(58) Field of Search ................................ 709/217, 218, 709/220, 226, 227, 237, 249, 236; 340/825

(56) References Cited

U.S. PATENT DOCUMENTS

| | | | |
|---|---|---|---|
| 5,313,465 A | 5/1994 | Perlman et al. | 370/85.13 |
| 5,331,634 A | 7/1994 | Fischer | 370/85.13 |
| 5,446,736 A * | 8/1995 | Gleeson et al. | 370/85.14 |
| 5,742,604 A * | 4/1998 | Edsall et al. | 370/85.13 |
| 5,774,461 A * | 6/1998 | Hyden et al. | 370/18 |

FOREIGN PATENT DOCUMENTS

| | | |
|---|---|---|
| EP | 700231 A2 | 3/1996 |
| WO | WO9508883 | 3/1995 |
| WO | WO9600468 | 1/1996 |
| WO | WO9601029 | 1/1996 |
| WO | WO962984 | 7/1996 |
| WO | WO9718657 | 5/1997 |

* cited by examiner

*Primary Examiner*—Zarni Maung
*Assistant Examiner*—Jason Cardone
(74) *Attorney, Agent, or Firm*—Winstead Sechrest & Minick P.C.

(57) ABSTRACT

Method and system aspects are provided for achieving effective communication among end stations in a local area network when portions of the network lack operating system support for the media of data transmission within the network. A method aspect includes providing an encapsulated packet from one end station of the portion of the plurality of end stations, and utilizing a tag as an indicator of encapsulation within the encapsulated packet. In a further method aspect, a method for communicating in a wireless local area network (WLAN) includes forming a data packet in accordance with a known media standard in a portion of the plurality of end stations. The method further includes encapsulating the data packet in accordance with the wireless media standard, and tagging the data packet to indicate encapsulation.

14 Claims, 4 Drawing Sheets

METHOD AND SYSTEM FOR EFFECTIVE NETWORK COMMUNICATION OF AN UNSUPPORTED MEDIA STANDARD BY ENCAPSULATED PACKET TAGGING

FIELD OF THE INVENTION

The present invention relates to local area networks (LANs) and more particularly to achieving effective communication within a LAN in a media that is unsupported in all computer systems within the LAN.

BACKGROUND OF THE INVENTION

The ability to share information across computer networks has been a significant achievement in the advancement of the computer industry. Certain protocols exist to support the communication of information across networks. Systems must therefore be able to provide data in accordance with these protocols in order to effectively utilize the networks.

From the software perspective of computer networks, application programs remain largely unaware of the presence of a network. The data they provide to or receive from the network is typically processed via software modules compatible with the network. FIG. 1 illustrates two typical approaches to providing the processing capabilities suitable for supporting network access. An initial approach for processing support utilized implementation of monolithic network protocol software (box 10) to achieve the translations and iterations necessary to take data from/to an application program (box 12) and transfer it to/from a network adapter, e.g., an Ethernet adapter, (box 14), as is well understood by those skilled in the art. Unfortunately, monolithic protocols 10 tend to be large with different adjustments required for each different vendor's version of the network adapter 14. Further, any changes done to the network adapter 14 usually require replacement of the entire monolithic protocol 10, which often results in inefficient and redundant development efforts for portions of the protocol 10.

Improvements in operating system software provides another more direct and efficient approach for supporting the network adapter 14 by containing much of the necessary processing as a part of the operating system itself. With the incorporation of the processing into the operating system, data from the application program 12 becomes layered with an operating system (OS) provided network protocol layer that is independent of the media access controller (MAC) of the system (box 16). Thus, a data packet 20 is appended with a protocol header 22. An operating system provided network protocol multiplexer that is dependent on the MAC (box 24) is further provided to pass the layered data through for addition of an independent hardware vendor (IHV) layer (box 26). The software module, IHV-provided layer 26 suitably appends a network header 28 that is in conformance with the network protocol, e.g., Ethernet protocol, and the vendor-specific MAC and adapter 14 of the system, as is well appreciated by those skilled in the art.

Unfortunately, the ability to support new media and protocols by an operating system is limited. The updating or redesign of operating systems tends to lag developments in hardware. For example, the emergence of wireless local area networks (WLANs) and the corresponding draft IEEE 802.11 protocol is not currently a network media standard supported by operating systems, although increasing numbers of computer systems include appropriate hardware/network adapters for communicating in a WLAN. In the past, when a network media has been introduced, initial support for the network media occurs through provision of a new monolithic mechanism 30 that adds the appropriate protocol header 32 and media header 34 to the data 36 from an application 12, as shown in FIG. 2. The system's network media adapter 40, e.g., an 802.11 adapter, then suitably transfers the packet across the media. The use of a monolithic approach does provide access for a system to the media, but as mentioned above, the monolithic approach is rather inefficient, since a variety of vendor-specific adapters and protocols must be supported. Thus, the monolithic mechanism 30 tends to become quite large with increases from the required awareness of multiple protocols.

Another typical solution for supporting the media attempts is to utilize existing operating system support for a known media standard. Thus, the initial process of transmitting data occurs as appears for a supported media, as described with reference to the boxes 12, 16, 24, and 26 of the right-hand side of FIG. 1. However, the packet is encapsulated with the data necessary for the unsupported media and protocol. Thus, as shown in FIG. 2, an IHV provided encapsulation layer 42 appends the media header 34 for the unsupported media standard to the encapsulated packet formed for the known media standard before being provided to a new media standard network adapter 44.

While either solution does achieve transmission across the media, the ability of those systems performing encapsulation to communicate with those having the monolithic solution is substantially nonexistent. Systems that perform encapsulation are able to recognize and appropriately process the known media data within the encapsulated packet. However, the monolithic systems are usually incapable of understanding such an encapsulated packet. Further, the packet having the proper format for the media remains untranslatable to the encapsulating system, since the encapsulating system does not have appropriate means to process unsupported media data directly. Thus, a barrier exists, as represented by block 50, between encapsulated packets and unencapsulated packets transmitted on the media. Proper communication is therefore not achieved, making the media highly ineffective for data transmission.

Accordingly, what is needed is a software-based solution that supports communication in a media by bridging data transfer between differing approaches to conformance with the media protocol.

SUMMARY OF THE INVENTION

The present invention provides method and system aspects for achieving effective communication among end stations in a local area network when portions of the network lack operating system support for the media of data transmission within the network. A method aspect includes providing an encapsulated packet from one end station of the portion of the plurality of end stations, and utilizing a tag as an indicator of encapsulation within the encapsulated packet. In a further method aspect, a method for communicating in a wireless local area network (WLAN) includes forming a data packet in accordance with a known media standard in a portion of the plurality of end stations. The method further includes encapsulating the data packet in accordance with the wireless media standard, and tagging the data packet to indicate encapsulation.

A system for computer networking according to a new media standard includes at least one first system, the at least one first system capable of producing encapsulated data packets, the encapsulated data packets including a tag, and at least one second system, the at least one second system capable of producing pure data packets, wherein communication between the at least one first station and the at least one second station occurs through recognition of packet type in the at least one first system based on whether the tag is present in a communicated packet.

With the present invention, encapsulation techniques are enhanced to allow communication in a network to occur appropriately between end stations. An advantage of the present invention is that those end stations that lack built-in operating system support of a data transmission media used by the network capably perform data transmission and reception with systems that do support the data transmission media. Thus, the ability to effectively utilize the media for communication among end stations is capably achieved. These and other advantages of the aspects of the present invention will be more fully understood in conjunction with the following detailed description and accompanying drawings.

DETAILED DESCRIPTION

The present invention relates to effective and efficient utilization of media access in a WLAN. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 3:
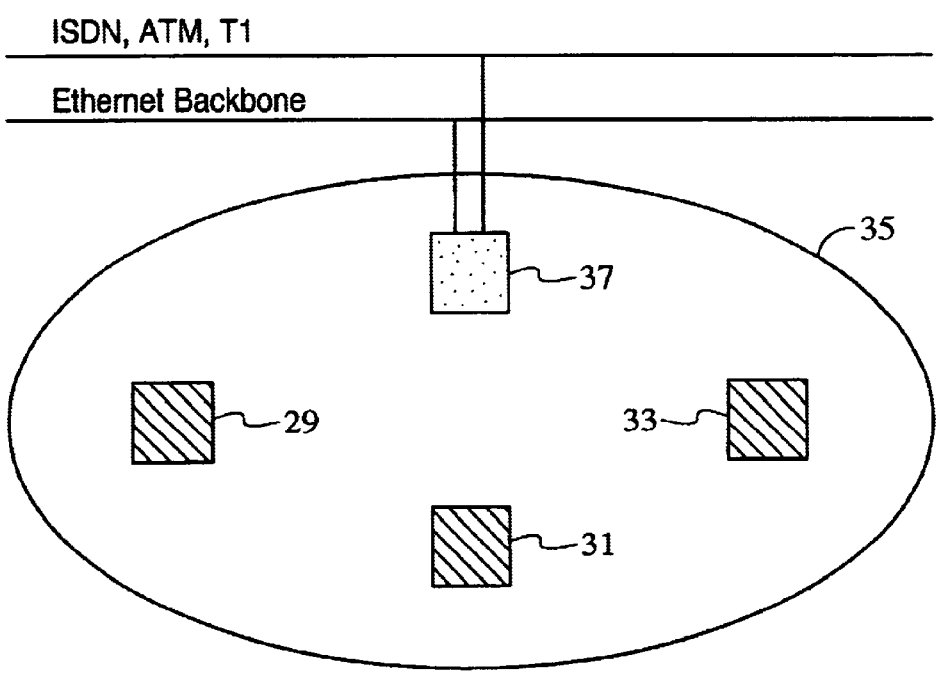
FIG. 3 illustrates a general diagram of a WLAN.

In a WLAN, end station units suitably employ radio communication using an FCC allotted frequency band of 2400 MHz (megaHertz) to fulfill performance expectations of wired LANs but without costly wire installation. One example of a WLAN is illustrated in FIG. 3. As shown, three end station units 29, 31, and 33 are in range with one another and have formed a portion of a WLAN 35. For purposes of this discussion, an end station suitably comprises a system, such as a personal computer, configured for implementation of network communication via the wireless media according to the 802.11 standard. Also included in WLAN 35 is an access point (AP) station 37 that can access both connection oriented and connection-less services. Thus, access point station 37 may support connection of end stations 29, 31, or 33 to both a local Ethernet backbone and some form of telecommunication transport, such as ISDN, ATM, or T1, as is well appreciated by those skilled in the art. It should be appreciated that although one AP station 37 and three end stations 29, 31, and 33 are shown in FIG. 3, other numbers and combinations of systems are possible for a given network situation.

The 802.11 standard for wireless networks, such as WLAN 35, suitably supports two modes of communication. In an ad hoc mode, transmission among end stations in a network occur as in any standard network, only the end stations involved communicate wirelessly, e.g., by infrared or radio-band transmission. In an infrastructure mode, the stations communicate with the access point station 37 to connect the wireless end stations to the backbone of a wired network, such as an Ethernet network.

Figure 2:
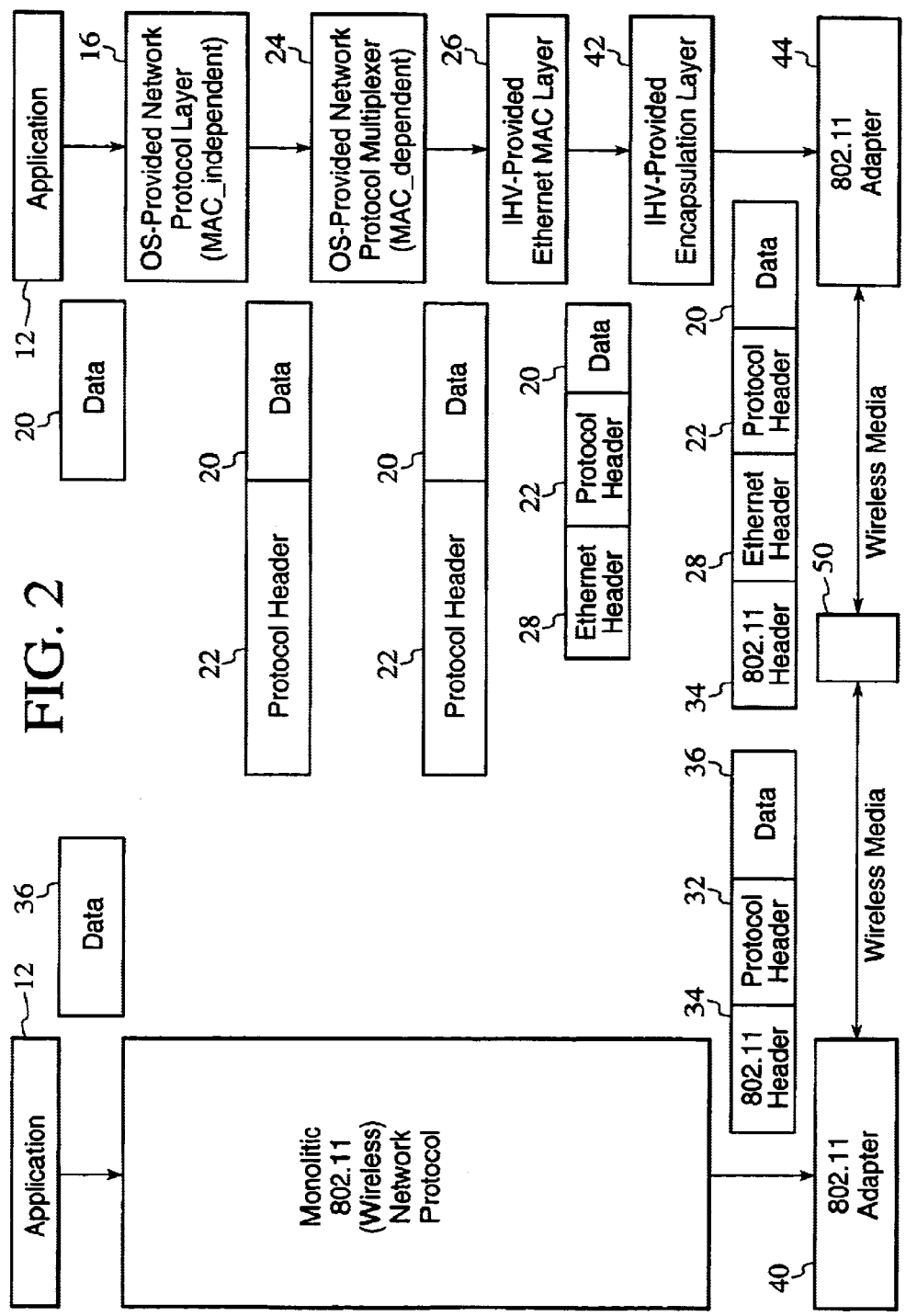
FIG. 2 illustrates two typical approaches to new media network access support.

Typically, an access point station 37 operates according to the monolithic protocol layer approach (e.g., 30, FIG. 2), such as in an embedded system or possibly in a computer system, as is well understood by those skilled in the art. As mentioned above, the monolithic approach not only is costly due to the large number of vendor-specific devices and MAC layers that need to be supported, it further restricts communication from the encapsulating systems, thus restricting access not only with other wireless stations, but with the Ethernet backbone, as well. Further, in the case of 802.11 standards, the differences in the use of the fields within the packet severely restrict the ability to merely associate compatible field types for two different media standards, as is possible between other differing media standards, e.g., addresses in Ethernet and FDDI.

Figure 1:
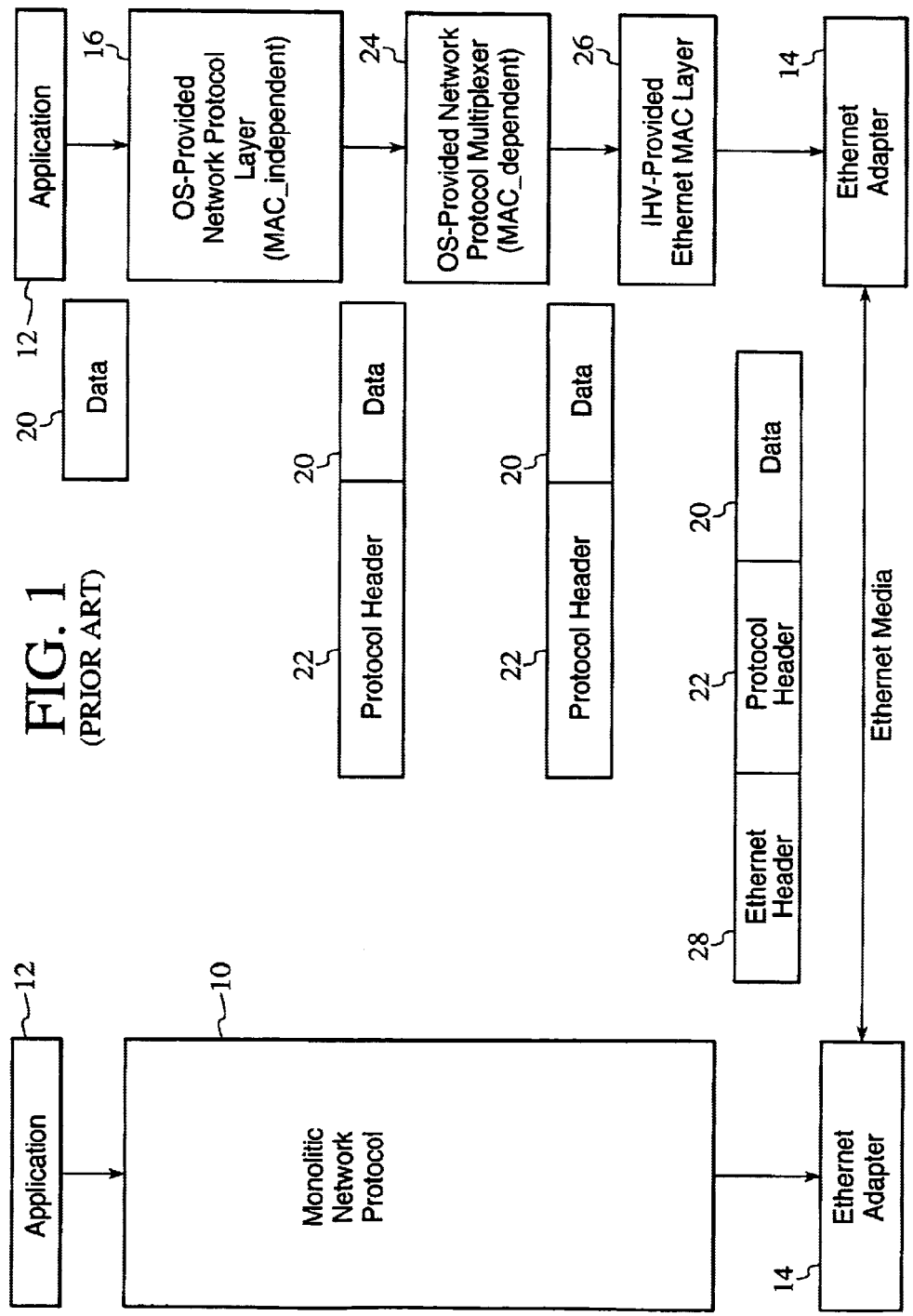
FIG. 1 illustrates two typical approaches to network access support.
Figure 4:
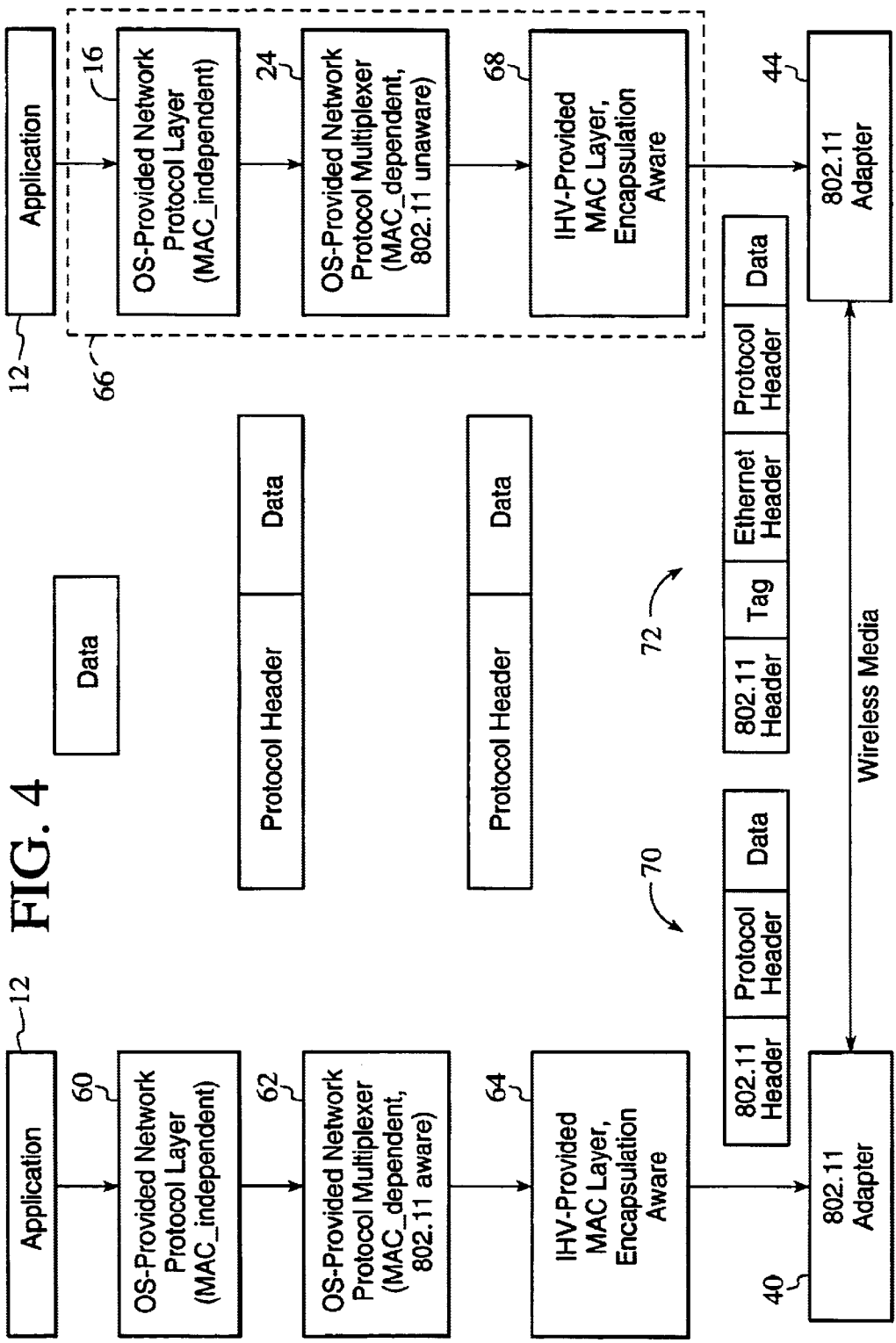
FIG. 4 illustrates an improved encapsulating system in accordance with the present invention.

As has been the case for the introduction of other media standards, over time, more operating systems are expected to provide support for the new media. As shown on the left-hand side of FIG. 4, similar to the operating system approach of FIG. 1, expectedly, a media aware operating system produces a packet that has the appropriate media header, protocol header, and data portion, as that produced by the monolithic system of FIG. 2. Thus, data from an application 12 is processed by an OS-provided network protocol layer mechanism that is independent of the MAC (box 60) before being transmitted through an OS-provided network protocol multiplexer that is both MAC dependent and 802.11 aware (box 62). The resulting packet is further processed by IHV-provided MAC layer mechanism (box 64) to append the media header for the packet for transmission on the wireless media.

In accordance with the present invention, an encapsulating system 66 provides packets that include a tag between the media header and the protocol header as formed by an IHV-provided MAC layer mechanism 68. The tag preferably acts as an indicator that the packet being transmitted is an encapsulated packet. A suitable tag comprises 48 bits (6 bytes) of predetermined logic values, such as 00-00-00-00-00-00. Encapsulating systems therefore recognize that another system uses the operating system solution when a packet received takes the form of packet 70 and lacks that tag indicator. The IHV-provided MAC layer 68 of the present invention can then process such packets by stripping the media header and appropriately passing through the protocol and data portions for processing by the system's OS. Further, other similar encapsulating systems are also readily recognized by receipt of packets 72 with the tag indicator. Accordingly, the IHV-provided MAC layer 68 performs the appropriate packet header stripping to pass the protocol and data portions through to the OS layers for processing. Future communication with other encapsulating systems is suitably performed by transmitting packets in the tag packet format 72, while communication with non-encapsulating systems is suitably performed by forming a pure data packet 70 for the media by not including the encapsulating data and tag.

Thus, the wireless media network lacks any barriers in communications between the encapsulating and non-encapsulating systems. Of course, other systems may provide their own unique form of encapsulation that would not be recognizable to that of the present invention. However, the present invention still achieves significant reduction in the communication barrier for the wireless media. Thus, systems in accordance with the present invention that lack support in the operating system for the media still effectively communicate via enhanced encapsulation techniques. Further, since it is expected that operating systems will be developed that support the media, e.g., the wireless media, the present invention recognizes the role of that developed system and successfully bridges support to it through the implementation of the improved encapsulation solution.

Although the present invention has been described in accordance with the embodiments shown, one of ordinary skill in the art will recognize that there could be variations to the embodiment and those variations would be within the spirit and scope of the present invention. For example, production of the software processing modules and layering mechanisms may be performed in any suitable programming language. Further, although the present invention is presented with reference mainly to a wireless media in accordance with 802.11 standards, the principles of the present invention presented are not restricted from application with future media formats. Accordingly, many modifications may be made by one of ordinary skill without departing from the spirit and scope of the present invention, the scope of which is defined by the following claims.

What is claimed is:

1. A method for achieving effective communication across a media of data transmission in a computer network, the computer network including a plurality of end stations, a portion of the plurality end stations lacking operating system support for the media, the method comprising:

providing an encapsulated packet from one end station of the portion of the plurality of end stations;

utilizing a tag as an indicator of encapsulation within the encapsulated packet; and providing the tag between a media header and a known media header in the encapsulated packet.

2. The method of claim 1 wherein the media header further comprises a wireless media header.

3. The method of claim 2 wherein the wireless media header conforms to an 802.11 standard.

4. The method of claim 1 further comprising identifying a packet as encapsulated when a received packet includes the tag.

5. The method of claim 1 wherein the known media header comprises an Ethernet header.

6. A system for computer networking according to a new media standard comprising:

at least one first system, the at least one first system capable of producing encapsulated data packets based on a protocol of a known media standard, the encapsulated data packets including a tag after a header for the new media standard and before a header for the known media standard; and at least one second system, the at least one second system capable of producing pure data packets, wherein communication between the at least one first station and the at least one second station occurs through recognition of packet type in the at least one first system based on whether the tag is present in a communicated packet.

7. The system of claim 6 wherein the pure data packets conform to a protocol in accordance with the new media standard.

8. The system of claim 7 wherein the new media standard comprises a wireless media under 802.11 standards.

9. The system of claim 6 wherein the known media standard comprises an Ethernet media standard.

10. The system of claim 6 further comprising at least one access point station, wherein the at least one access point station allows connection of the at least one first system to a known media network backbone.

11. A method for communicating in a wireless local area network (WLAN), the WLAN including a plurality of end stations, a portion of the plurality of end stations lacking operating system support of a wireless media standard, the method comprising:

forming a data packet in accordance with a known media standard in the portion of the plurality of end stations;

encapsulating the data packet in accordance with the wireless media standard; and tagging the data packet to indicate encapsulation including placing a tag between a header for the known media standard and a header for the wireless media standard.

12. The method of claim 11 wherein tagging further comprises appending predetermined bits to the formed data packet.

13. The method of claim 11 wherein an independent hardware vendor media access controller layer provides the encapsulating and tagging of the data packet.

14. The method of claim 11 wherein an operating system forms the data packet in accordance with the known media standard.

* * * * *